United States Patent Office 3,436,948
Patented Apr. 8, 1969

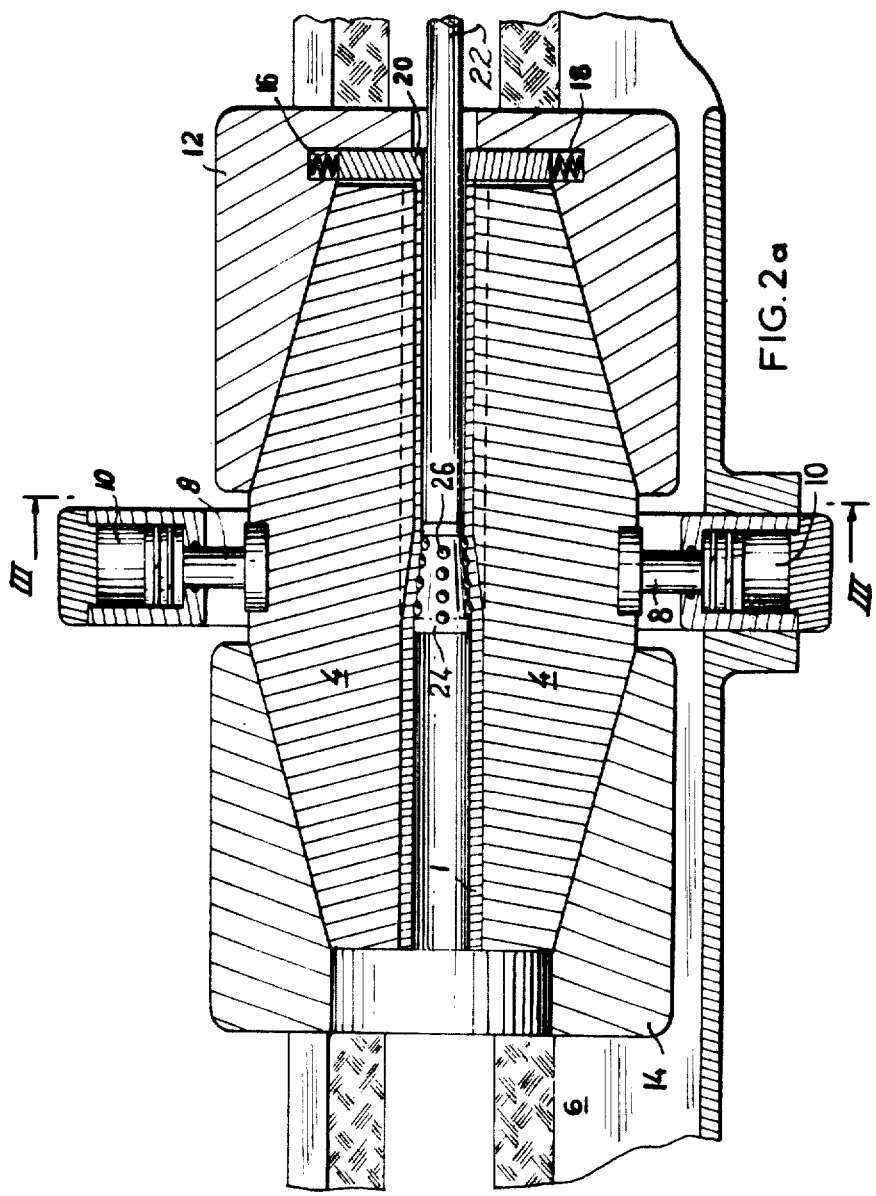

3,436,948
METHOD OF FABRICATION OF FINNED TUBES AND DEVICE FOR THE APPLICATION OF SAID METHOD
Pierre Portal, Bologne, and Andre Trieule, Neuilly-sur-Seine, France, assignors to Commissariat à l'Energie Atomique, Paris, France
Filed May 5, 1964, Ser. No. 365,092
Claims priority, application France, May 13, 1963, 934,667
Int. Cl. B21b 17/02; B21j 13/02
U.S. Cl. 72—370                   5 Claims

ABSTRACT OF THE DISCLOSURE

Finned tubes are formed from tubular workpiece stock by exerting internal oscillating substantially radial forces within the stock displaced from one end to the other of the workpiece to force a predetermined thickness of the workpiece into the grooves of a die to form fins while limiting the pressure of the air trapped within the grooves of the die as the fins are formed.

---

The present invention relates to the fabrication of tubes having a smooth internal surface and an external surface which is provided with fins inclined to the axis of the tube. The invention has for its object a method of fabrication of tubes of this type and a device for the application of said method or of a similar method.

Tubes with external fins are frequently employed for heat-transfer purposes. They are employed especially for the purpose of separating two fluids in motion between which a heat-transfer process is to take place or for the purpose of forming nuclear fuel element cans which separate the fissile material from the heat-transporting fluid of the reactor. The cans of the type hitherto designed in particular for the last-mentioned application are provided with an even number of longitudinal groups of fins which are inclined to the axis of the can and which each occupy a tubular sector of said can, the fins of each group being inclined in a direction opposite to that of the two adjacent groups so as to form a so-called "herringbone" pattern.

The fabrication of tubes provided with fins which are inclined to the axis and especially of tubes with "herringbone" fins gives rise to difficulties. The machining of fins of this type by means of the usual methods which call for the use of machine tools is often difficult. It has already been proposed to form tubes of this type by drawing an expander plug through a tubular workpiece so as to force the metal of the tube wall into grooves formed in an external tubular die. Unfortunately, the rubbing friction of the expander plug against the internal surface of the tubular workpiece draws the metal and results in deformation of the fibers which is detrimental to the resistance of the fins when these latter are subjected to the action of a flow of gas at high temperature. Moreover, since the grooves which are formed in the die are usually intended to be completely filled by the metal of the workpiece which creeps under the action of the plug as this latter is being drawn through, the compression of the gas which is present within said grooves exerts an opposing force which increases to a substantial extent the tractive force which it is necessary to apply to the expander plug.

The present invention is directed to the basic concept of a method of fabrication which meets practical requirements more effectively than the processes of the prior art, particularly insofar as it prevents the distortion of the fibers during fabrication and permits the possibility of producing a tube which is virtually homogeneous.

With this object in view, the invention proposes a method of fabrication of tubes having a smooth internal surface and an external surface which is provided with fins inclined to the axis of the tube, said method consisting in placing a tubular workpiece within a die which is made up of a series of finned elements each designed to reproduce an angular sector of said fins, in then exerting a substantially radial stress on said workpiece in a zone of application which is displaced axially from one end to the other of said workpiece so as to cause a predetermined thickness of said workpiece to creep into the die while at the same time limiting the pressure of air which is enclosed between said die and the fins progressively as said fins penetrate within said die.

The invention also proposes a device for the fabrication of metal tubes having a smooth internal surface and an external surface which is provided with fins inclined to the axis of the tube, starting from a workpiece of metal tube stock, said device comprising a series of shells each provided with grooves corresponding to the fins of one angular sector of the tube and each fitted with a jack for producing the radial displacement of said shell between an inner position relative to an axis wherein all the shells are in contact with each other so as to form a die and an outer position wherein said shells are separated from each other, and further comprising an expander head for forcing the metal of said tubular workpiece into the grooves of said shells, said expander head being provided with means for displacing said head along said workpiece in a movement of angular oscillation.

The limitation of air pressure can be effected either by providing each groove with escape vents or simply by endowing each groove with a depth which is greater than the intended height of each fin after extrusion of the tubular workpiece. As regards the motion which is imparted to the expander head, the combination of rotational motion and axial motion serves to prevent the longitudinal drawing of the internal portion of the tubular workpiece in the radial direction under the action of the expander head and therefore to provide the fibers with a more favorable condition for ensuring the resistance of the fins, as will be explained hereinafter.

A number of other advantages and characteristics features of the invention will in any case become apparent from the detail description which now follows in reference to one form of embodiment which is given by way of example and which is illustrated in the accompanying drawings, wherein:

FIG. 3 is a view in cross-section taken along the line III—III of FIG. 2a;

Figure 1:
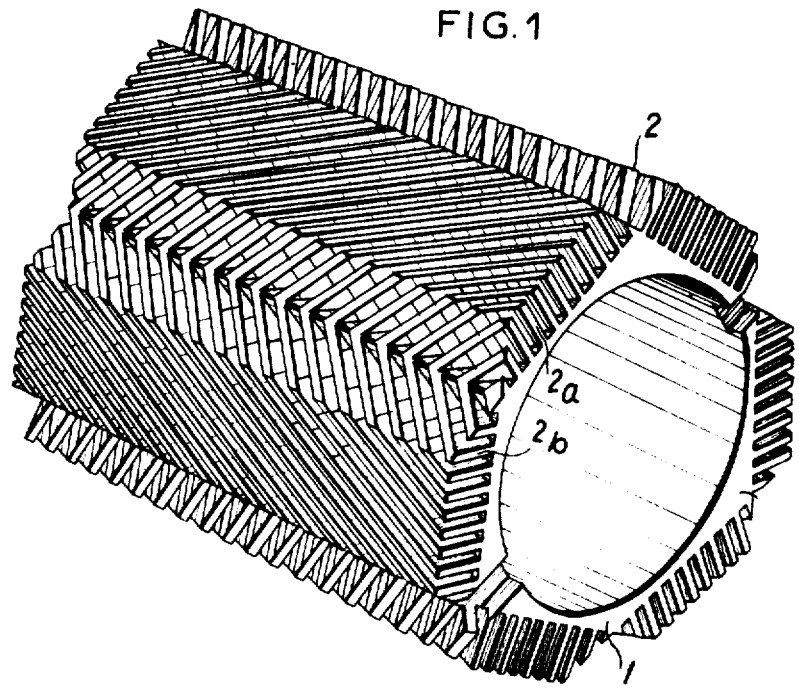
FIG. 1 shows a tube on which are formed a number of parallel groups of fins arranged in "herringbone" pattern.
Figure 2:
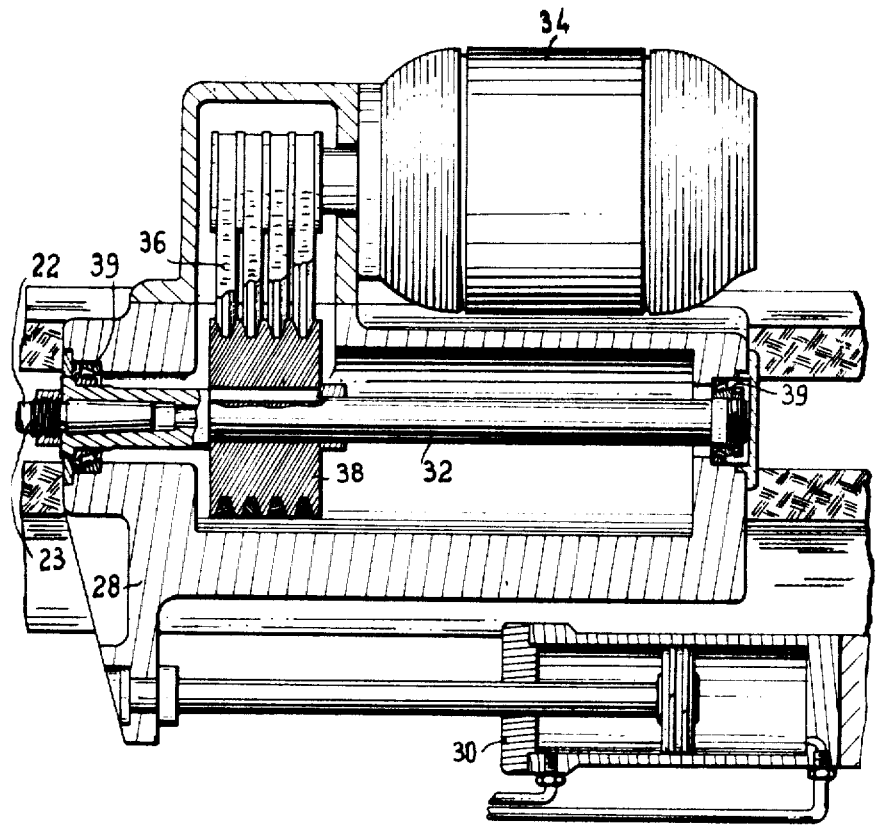
FIGS. 2a and 2b show in longitudinal cross-section the two parts of a device in accordance with the invention for the purpose of forming a tube according to FIG. 1.
Figure 3:
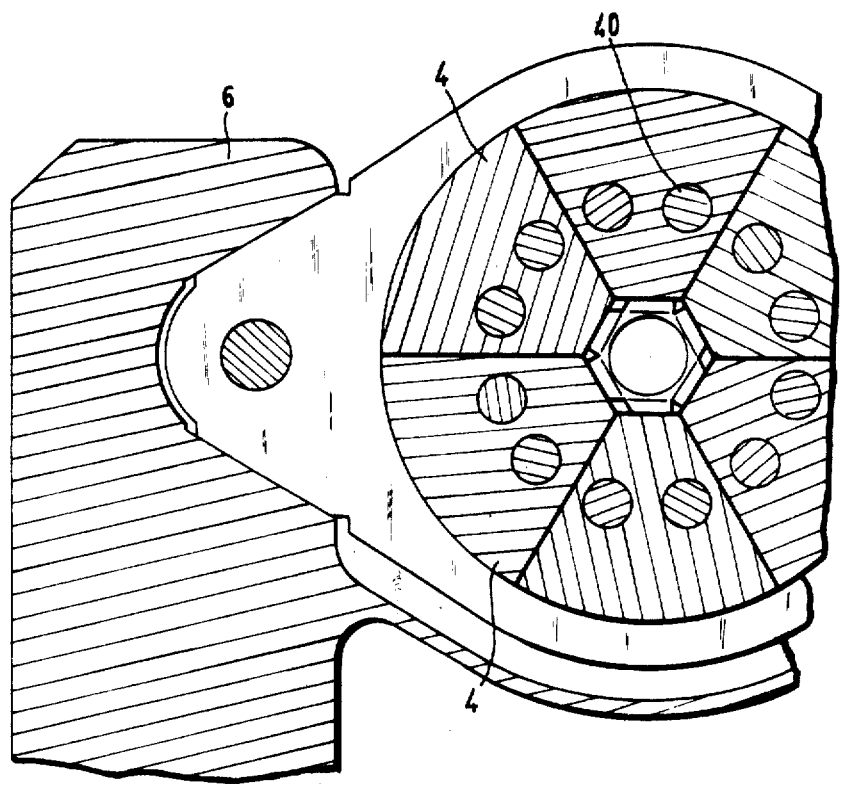

The device which is illustrated in FIGS. 2a, 2b and 3 intended for the fabrication of finned "herringbone" tubes of the type which is illustrated in FIG. 1. The tube 1 has a smooth internal bore and an external surface on which are formed six groups of parallel fins 2, the fins 2a of one group being oppositely inclined with respect to the fins 2b of the adjacent group.

The device which is illustrated in FIGS. 2a, 2b and 3 comprises a stationary frame 6 carrying a die which consists of six shells 4, each shell being provided with grooves corresponding to one group of fins 2a or 2b. There is fitted between the frame 6 and each shell 4 a jack 10, the cylinder of which is secured to the frame and the operating rod 8 of which is secured to the shell. The six jacks which are thus provided are designed to displace said shells radially towards a longitudinal axis and starting from this latter between an inner position and an outer position. When the shells take up the inner position in which they are shown in FIG. 2a, they are accordingly in contact with each other and define the external shape of the tube to be fabricated. When said shells are located in the outer position, they accordingly release the tube.

The immovable fixation of the die on the frame in the longitudinal direction relatively to the axis and the locking of the shells in the inner position are carried into effect by means of two sleeves 12 and 14. Each sleeve provides a frusto-conical recess which is intended to fit over the terminal portion of the die which has a coresponding shape. Jacks which have not been shown in the drawings and mounted on the frame 6 control the longitudinal displacement of the sleeves 12 and 14 between the working position in which said sleeves are respresented in FIG. 2a and in which these latter immobilize the die and a rest position in which they are outwardly displaced and thus release the die.

The position-maintenance of the tubular workpiece during the forming operation is ensured by means of dogs 20 which are slidably mounted in radial recesses of the sleeve 12 and thrust towards the axis of the tube by springs 18.

A rod 22 is mounted along the axis and provided at the rear end thereof with a conical head 24, the large base of which has a diameter which is larger than that of the tubular workpiece whilst the small base has a smaller diameter. In the surface of the conical head are formed recesses in which are fitted balls 26 which project from the surface. The said balls are set in staggered relation in the form of embodiment described but other arrangements are of course possible. Similarly, the balls could be replaced by other rolling members such as rollers.

The rod is coupled to a driving mechanism which is illustrated in FIG. 2b and which is designed to impart a swash-plate or wobbling motion to said rod. By the term "swash-platemotion" is meant a longitudinal movement of angular oscillation or in other words a component of axial translational motion and a component of rotational motion. Helical motion can be classed in this category and is the form of motion which is employed in the mechanism shown in FIG. 2b, wherein it is possible to superimpose on a uniform translational motion a sinusoidal movement of rotation and the like.

The mechanism consists of a drum 28 which is driven in translational motion parallel to the axis with respect to the frame 6 by a jack 30 which is mounted on said frame. The drum carries a motor 34 which drives in rotation through the intermediary of driving belts 36 and driving pulleys 38 a spindle 32 which is made fast for translational motion with the drum by means of roller-bearings 39. A threaded coupling 23 serves to secure the spindle 32 to the rod 22 both for translation motion and rotational motion. A synchronization system can be provided between the motor 34 and the jack 30 so as to establish at a suitable value the pitch of the helical path followed by one ball of the head.

The method of fabrication of the threaded tube 1 from metal tube stock in the device which has just been described can readily be understood. In order to prepare a tube of the type which is illustrated in FIG. 1, the starting material is preferably a workpiece with an external surface having a hexagonal transverse cross-section. The sleeves are in their outwardly displaced position, the jacks 10 are operated so as to move the shells 4 apart and the workpiece is slipped into position along the axis until it comes into abutting contact with the dogs 20. The workpiece is then locked in position by closing the shells 4 and the sleeves 14. Since the drum 28 is in the position which is nearest the die, the rod 22 is inserted in the workpiece and rigidly fixed to the spindle 32 by screwing.

Figure 4A:
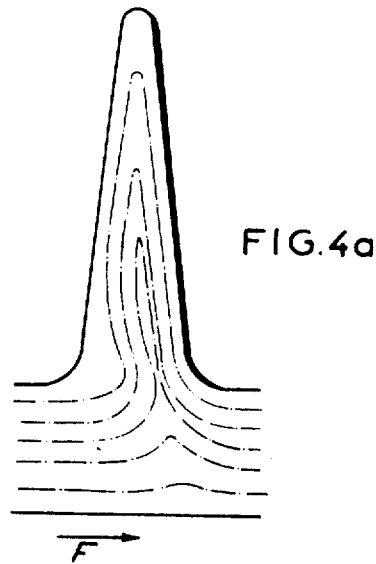
FIGS. 4a and 4b are diagrammatic views on a larger scale showing a fin and its root in cross-section taken along a plane which passes through the axis of the tube.

It is then merely necessary to start up the motor 34 and the jack 30 so as to initiate the rotation of the rod 22 and of the head 24 as well as the axial translational motion of these latter along the workpiece. Progressively as the head 24 penetrates within the workpiece, the balls 26 expand the metal of which said workpiece is formed and cause the said metal to creep into the grooves of the shells 4. If special precautions were not taken, the rubbing contact of the head would tend to draw the metal of the internal portion of the workpiece in the longitudinal direction. This would be the case if the frusto-conical head were to bear directly against the workpiece and if said head were endowed solely with a movement of translation. In such a case, the metal fibers in one fin of the finished tube would be arranged as represented diagrammatically in FIG. 4a wherein the arrow F indicates the direction of displacement of the head. This arrangement of fibers is detrimental to the resistance of the fins when subjected to a gas flow at high temperature which tends to deflect the fins.

Figure 4B:
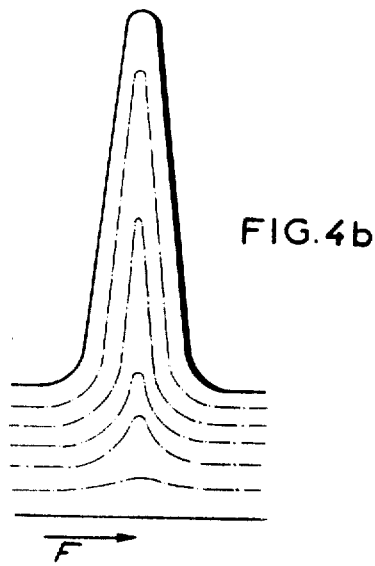

In accordance with the present invention, the head is fitted with rolling members consisting in the form of embodiment shown of balls 26 which reduce the rubbing friction of the tube and virtually transform the action of the head into a radial stress within the workpiece. The swash-plate motion of the head which imposes on the rolling members an oblique movement relatively to the axis limits to an even greater extent the longitudinal effort which is exerted on the internal portion of the workpiece, and the fibers accordingly set themselves in the arrangement which is shown diagrammatically in chain-dotted lines in FIG. 4b.

It should also be noted that the grooves which are formed in the shells and which are intended to establish the shape of the fins 2a and 2b have a depth which is greater than the intended height of the fins. This limits the opposing force exerted by the air which is imprisoned between the bottom of each groove and the corresponding fin during the extrusion of this latter.

It can be noted by way of example that the longitudinal tractive force to be applied on the rod decreases from 50 tons when the grooves are intended to be filled completely to 10–15 tons when the grooves have a sufficient depth or, better still, when said grooves are provided with escape vents.

After the head 24 has passed through the workpiece from end to end, the tube is freed by withdrawal of the sleeves and the shells and then transferred to a machine tool for the finishing operation.

In order to bring the workpiece up to a temperature which is sufficient to assist the plastic flow of metal, heating electrodes such as the electrode 40 can be provided in each shell 4, thus permitting the die to perform the additional function of a furnace. The calorific power of said die makes it possible to bring the workpiece up to the desired temperature in a very short time.

It can be noted by way of example that a device of the type described has been employed for the purpose of fabricating cans of magnesium-zirconium alloy having a low zirconium content and provided with six groups of herringbone fins of the type shown in FIG. 1. The workpiece consisted of a six-sided tube having a width per side of 47 millimeters and an internal diameter of 29.2 millimeters. The conical 32.7 millimeter expander head rotated at 100 r.p.m. for a period of 1 minute and the forming process was carried out at 450° C. The die was provided with grooves 11 millimeters in depth whereas the finished fins were designed to have a height of 9 millimeters from root to tip.

When the size of the grooves is greater than that of the fins to be formed, the fins of the tubes obtained in accordance with the process which has just been described do not offer a sufficient degree of uniformity for certain applications and must therefore be ground. This applies especially in the case of cans for nuclear fuel elements. However, when it is necessary to trim the tips of the fins of a same group in order to set them at the intended height, certain difficulties are encountered when the height of said fins is substantial compared with the thickness, on account of the low resistance of said fins to the forces which are applied in the direction at right angles to their development. The pressure of the machine tool tends to deflect the fins and thus reduce the accuracy of machining, with a resulting danger of permanent deformation or chipping of the fin tips.

An advantageous process which makes it possible to overcome this drawback consists in coating the workpiece with a solid product which is capable of undergoing a reversible transformation between the liquid state and solid state by solidification of said product on said workpiece, in removing material from the combined assembly consisting of said workpiece and said product in the solid state, followed by the liquefaction of said product.

The coating can be carried into practice in particular by immersion of the tube to be ground in a vessel containing a liquid which has a melting temperature in the vicinity of ambient temperature, and by solidification of said liquid by reduction of the temperature below the melting point. The liquid can be water, which has the advantage of a freezing temperature in the vicinity of ambient temperature as well as high latent heat of melting.

The grinding of the tube is performed on the entire composite assembly which consists of the tube together with its enclosing jacket of ice. The combined assembly can be mounted, for example, on centering cones applied against a space which is left free of ice for this purpose at the end portions of the bore of said tube. Once the grinding operation has been completed, it is merely necessary to expose the tube to the surrounding air in order that the ice should thus melt of its own accord.

The use of ice offers the additional advantage of effecting the cooling of the cutting tool during the machining operation and makes it possible in certain cases to dispense with the need for any cooling by means of a jet of liquid directed onto the tool.

By way of example, the method described has been employed for the purpose of planing the fins of a low alloy magnesium can having a bore of 29 millimeters and herringbone fins of 9 millimeters in height; the operation was performed in a single pass for each group of fins on a workpiece which had previously been coated with ice within the bore and within the fin channels and projecting to a distance of a few millimeters beyond the outer periphery of the fins.

The examples described above have of course been given solely by way of explanatory illustration and it must be understood that the scope of this patent extends to all alternative forms of all or a part of the arrangements heretofore described and which remain within the definition of equivalent mechanical means.

What we claim is:

1. Method of fabrication of tubes having a smooth internal surface and an external surface which is provided with fins inclined to the axis of the tube, the steps of placing a tubular workpiece within a die having a series of grooved elements each reproducing an angular sector of said fins, then exerting oscillating, substantially radial stresses on said workpiece in a zone of application which is displaced from one end to the other of said workpiece to cause a predetermined thickness of said workpiece to creep into the grooves of the die to form fins and at the same time limiting the pressure of air which is trapped within the grooves of said die as the fins are formed within said grooves.

2. A device for the fabrication of metal tubes having a smooth internal surface and an external surface having fins inclined to the axis of the tube from metal tube stock, comprising a stationary support, at least three shells, grooves in each of said shells corresponding to the fins of one angular section of the tube, a jack for each of said shells radially secured to said support for radial displacement of said shells between an inner position relative to an axis wherein said shells are in contact and form a die and an outer position wherein said shells are separated from each other, an expander head movable through said stock forcing the metal of said stock into said grooves, means for displacing said head through said stock in a longitudinal movement of angular oscillation, means for limiting the pressure of the air trapped and compressed in said grooves by the metal forced therein, a clamping sleeve movable axially with respect to said shells to lock said shells together as a die and retractable thrust receiving dogs in said sleeve engaging the front of said stock and receiving the thrust exerted by said expander head on said stock.

3. A device for the fabrication of metal tubes having a smooth internal surface and an external surface having fins inclined to the axis of the tube from metal tube stock comprising a stationary support, at least three shells, grooves in each of said shells corresponding to the fins of one angular sector of the tube, a jack for each of said shells radially secured to said support for radial displacement of said shells between an inner position relative to an axis wherein said shells are in contact and form a die and an outer position wherein said shells are separated from each other, an expander head movable through said stock forcing the metal of said stock into said grooves, means for displacing said head through said stock in a longitudinal movement of angular oscillation, means for limiting the pressure of the air trapped and compressed in said grooves by the metal forced therein, said head displacing means comprising a drum on said support for axial translational movement with said expander head, a jack on said support connected to said drum for movement of said drum relative to said shells and means for rotating said expander head mounted on said drum.

4. A device for the fabrication of metal tubes having a smooth internal surface and an external surface having fins inclined to the axis of the tube from metal tube stock, comprising a stationary support, at least three shells, grooves in each of said shells corresponding to the fins of one angular sector of the tube, a jack for each of said shells radially secured to said support for radial displacement of said shells between an inner position relative to an axis wherein said shells are in contact and form a die and an outer position wherein said shells are separated from each other, an oscillatable expander head movable through said stock forcing the metal of said stock radially outward only into said grooves, means for displacing said head through said stock in a longitudinal movement of angular oscillation, the depth of said grooves being greater than the height of the fins formed therein thereby limiting the pressure of the air trapped and compressed in said grooves by the metal forced therein.

5. Device in accordance with claim 4 including a heating electrode mounted in each of said shells and disposed parallel to the axis of the tube.

References Cited

UNITED STATES PATENTS

| 1,798,742 | 3/1931 | Kellogg | 72—117 X |
| 3,231,477 | 1/1966 | Saunders et al. | 165—184 X |

FOREIGN PATENTS

| 838,984 | 6/1960 | Great Britain. |
| 866,554 | 4/1961 | Great Britain. |
| 344,886 | 11/1936 | Italy. |

JOHN F. CAMPBELL, *Primary Examiner.*

P. M. COHEN, *Assistant Examiner.*

U.S. Cl. X.R.

29—157.3; 176—81; 165—181; 72—469, 478